W. SOLT, Sr.

Assignor of one-half to W. D. KLINE.

GRATE BAR.

No. 10,670. Reissued Dec. 8, 1885.

WITNESSES

Recy C. Bowen.

E. G. Siggers.

INVENTOR

William Solt Sr.:

By C. A. Snow & Co.

his Attorneys.

N. PETERS, Photo-Lithographer, Washington, D. C.

UNITED STATES PATENT OFFICE.

WILLIAM SOLT, SR., OF FREELAND, ASSIGNOR OF ONE-HALF TO WILLIAM D. KLINE, OF SOUTH HEBERTON, PENNSYLVANIA.

GRATE-BAR.

SPECIFICATION forming part of Reissued Letters Patent No. 10,670, dated December 8, 1885.

Original No. 303,675, dated August 19, 1884. Application for reissue filed October 30, 1885. Serial No. 181,421.

*To all whom it may concern:*

Be it known that I, WILLIAM SOLT, Sr., a citizen of the United States, residing at Freeland, in the county of Luzerne and State of Pennsylvania, have invented a new and useful Grate-Bar, of which the following is a specification, reference being had to the accompanying drawings.

This invention has relation to adjustable ventilator grate-bars for boiler-furnaces.

Prior to my invention it has been proposed to provide a grate-bar with detachable finger-sections; but in such cases the bearing-bar to receive the sections was constructed either of a single piece or of two pieces bolted together. When the grate or bearing bar is made from a single piece, it is necessary to provide a swell or enlargement at various intervals along the bar to form mortises in which the lugs or tenons of the finger-sections were received. Furthermore, this arrangement of the grate or bearing bar required it to be constructed very thick and heavy, and, besides, no provision was made for ventilating the same to obviate the danger of burning out or warping. When the grate or bearing bar was constructed of two or more bars bolted together—an expedient devised to overcome the defects of the old single bar—practice demonstrated that such a construction was entirely worthless for the purpose designed. While the bar would provide equal facilities for ventilating purposes as my bar, yet in a practical sense the bar would not stand the wear and tear incidental to its use, the bolts being burned out and causing the bars to separate.

My invention overcomes the objection urged against both of said bearing or grate bars by forming the same in one piece with two side walls, substantially in the shape of a U in cross-section, the top of the bearing-bar being perforated with any number or size of openings for ventilating purposes, and having mortises at suitable intervals to receive the depending tenons or lugs on the finger-sections.

My invention therefore consists in the peculiar construction, combination, and novel arrangement of parts, as will be hereinafter fully described, and particularly pointed out in the claims.

Figure 1:
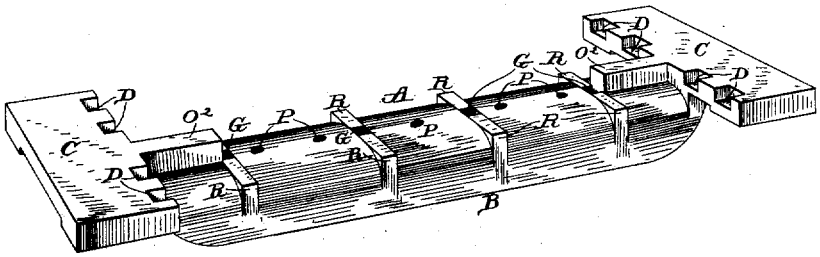
Figure 2:
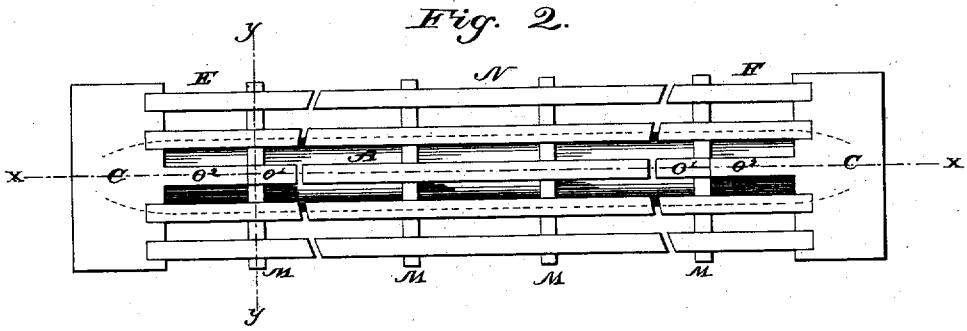
Figure 3:
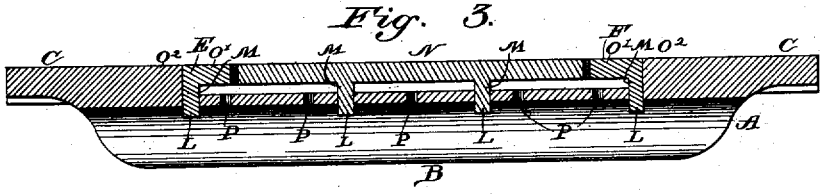
Figure 4:
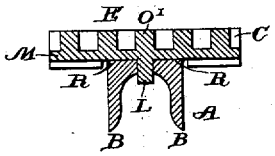

In the accompanying drawings, Figure 1 is a perspective view of the channeled perforated grate or bearing bar with the finger-sections removed. Fig. 2 is a plan view with the finger-sections in place. Fig. 3 is a vertical longitudinal section on the line *x x*, Fig. 2, and Fig. 4 is a transverse vertical section on the line *y y*, Fig. 2.

Referring by letter to the accompanying drawings, A designates the channeled grate or bearing bar, which is in shape of an inverted U in cross-section at its middle, having side walls, B B, curved from end to end, as shown, and connected together at the top by being cast in one piece. At the ends of the bar A are located bearing-plates C C, which are supported in the walls of the furnace in any suitable manner. Said plates are provided with a section, $O^2$, of the middle finger of the end finger-section, and are also formed with recesses on their inner sides, which provide seats D for the reception of the fingers of the end finger-sections.

The object sought after in constructing the grate or bearing bar channeled on the under side is to reduce the cost and to make the bar much lighter than those now on the market. The same advantages are gained by having the side walls, B, curve or decrease in length toward their ends; but in casting the grate or bearing bar A with the end plates, C, integral therewith it is found necessary to compensate for this lightness in the ends of the bearing-bar, and this I do by casting the sectional finger $O^2$ integral with the bar A and plates C, the whole forming one single casting. The sectional finger $O^2$ strengthens the ends of the bearing or grate bar and compensates for the hollow formation of the same, enabling the grate-bar, as light and simple as it is, to withstand strain equal to a heavy solid bearing-bar.

E F N designate the finger or grate sections, the fingers of which are cast with transverse bars M, having depending tenons or lugs L. It will be understood that as many of these sections may be used as desired, according to the size of the furnace.

In the arch or top of the grate or bearing bar A are provided mortises G, for the reception of the tenons L on the detachable finger-sections. When the top of the bearing-bar is made rounding, laterally-extending shoulders R are provided at each side of the mortises, to form a flat horizontal bearing for the transverse bars M of the finger-sections. The end finger-sections, E F, each carry the remaining section O′ of the middle finger. The top of the bar A is provided with a sufficient number of perforations, P, of any suitable size and shape for ventilating the bar and finger sections and to keep the parts cool, so as to prolong their usefulness. By this construction the bar A is made a cooling-bar in its action, and will last for years on this account. When any one of the finger-sections is burned out so as to be worthless, it may be quickly removed and replaced by a new section while the fire is in progress without pulling out the fire or disturbing the bearing-bar. For removing and inserting the sections I preferably use a pair of handle-tongs. Sufficient space should be left between the ends of the finger-sections to allow for contraction and expansion. The ends of the finger-sections are preferably curved, as shown, to prevent the scraper or poker from dropping into the openings between the sections and becoming fast when moving the scraper back and forth transversely over the grate.

By my improved grate-bar increased ventilation is obtained which will give additional draft to the fire and allow more perfect combustion of the fuel, thereby effecting a saving in this respect, which advantage will be appreciated by those having occasion to use furnaces in their business.

Having described my invention, I claim—

1. The channeled bar A, consisting of the side walls, B B, connected together at the top, the bearing-plates C C at the ends, and the integral finger $O^2$, all cast in one piece, as set forth.

2. The bar A, substantially U-shaped in cross-section and provided with mortises in its top, in combination with the detachable grate-sections having tenons to fit in the mortises, as set forth.

3. The herein-described detachable grate-sections having their ends curved, for the purpose set forth.

4. The bearing-bar having end plates, C C, provided with seats D, in combination with the detachable grate-sections having their ends received in the seats, as set forth.

5. The grate or bearing bar, consisting of side walls, B, connected together at the top and cast in one piece, and ventilating perforations or openings in the top of the bar, in combination with the detachable grate-sections having depending tenons or lugs to fit in mortises or openings in the top of the bearing-bar, as set forth.

6. The channeled and perforated grate-bar A, provided with the end plates, C C, having seats D, and the mortises and laterally-extending shoulders, in combination with the detachable finger-sections having their transverse bars provided with tenons, as set forth.

7. The combination, with the channeled and perforated grate-bar A, having the middle finger-sections, $O^2$, cast thereon, of the end sections provided with a section of the middle finger, as set forth.

8. The grate or bearing bar, consisting of side walls, B, connected together at the top and cast in one piece, in combination with the grate-sections detachably fitted to the bearing-bar, as set forth.

9. The grate or bearing bar, consisting of side walls, B, connected together at the top and all cast in one piece, in combination with the detachable grate-sections provided with depending tenons, to fit in mortises or openings provided along the top of the grate or bearing bar, as set forth.

In testimony that I claim the foregoing as my own I hereto affix my signature in the presence of two witnesses.

WILLIAM SOLT, SR.

Witnesses:
WM. E. WATKINS,
CHAS. A. JOHNSON.